(No Model.) 2 Sheets—Sheet 1.
C. L. COFFIN.
ELECTRIC WELDING.
No. 477,101. Patented June 14, 1892.
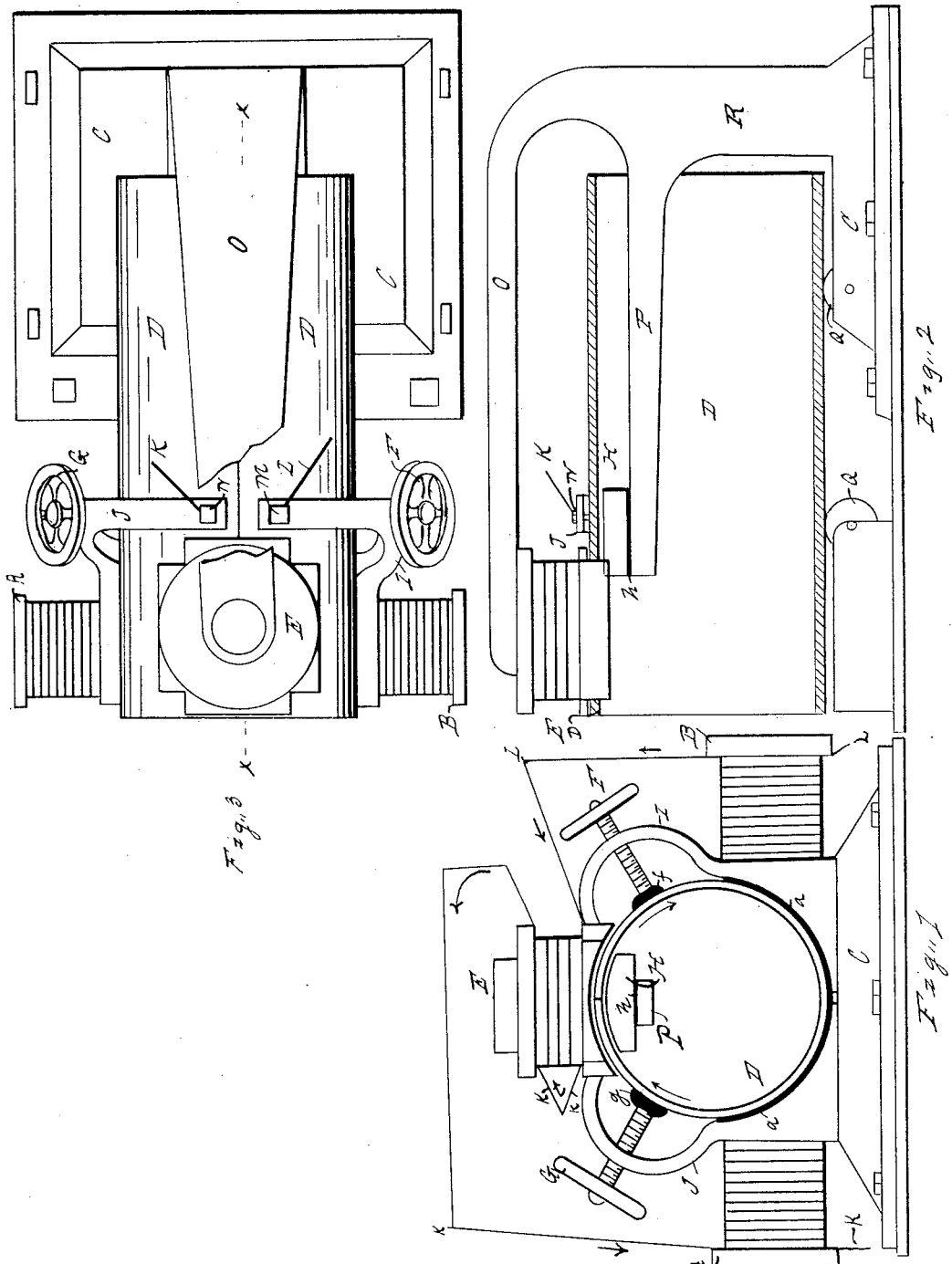

(No Model.) 2 Sheets—Sheet 2.
C. L. COFFIN.
ELECTRIC WELDING.
No. 477,101. Patented June 14, 1892.
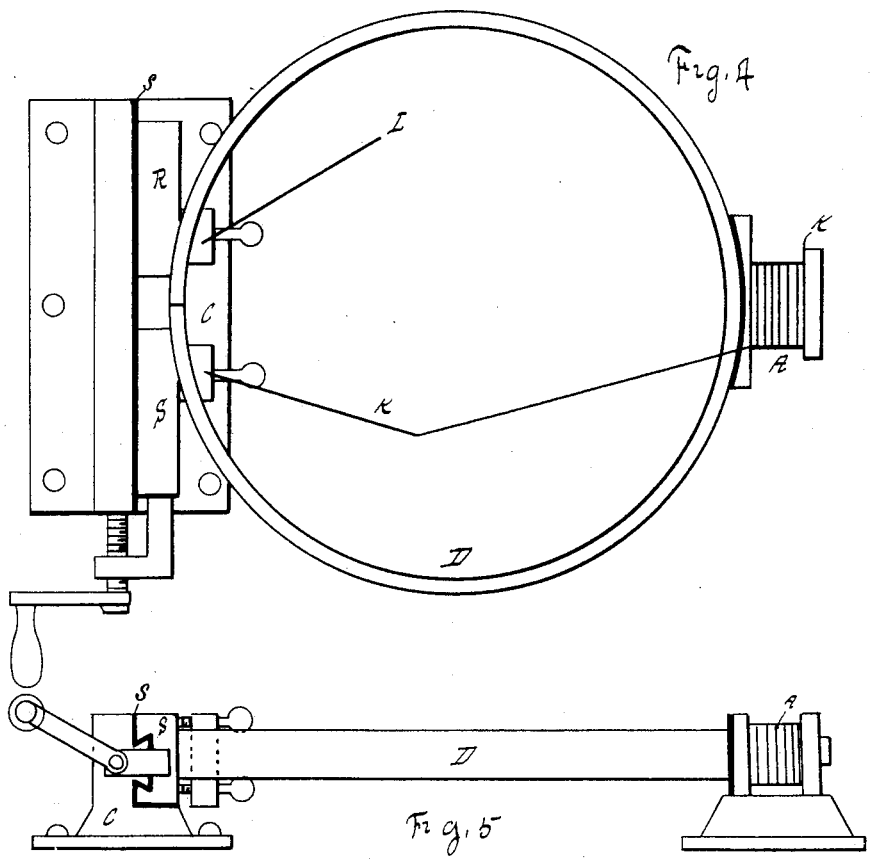
Witnesses
Inventor
Charles L. Coffin.

UNITED STATES PATENT OFFICE.

CHARLES L. COFFIN, OF DETROIT, MICHIGAN.

ELECTRIC WELDING.

SPECIFICATION forming part of Letters Patent No. 477,101, dated June 14, 1892.

Application filed November 6, 1889. Serial No. 329,393. (No model.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention consists in a process of welding metals electrically, hereinafter fully described and claimed.

The drawings show apparatus which may be used to practice my invention as applied to welding a pipe or hoop.

Figure 1 is an end elevation. Fig. 2 is a side elevation, partly in section; and Fig. 3 is a top plan view, partly broken away, showing my invention applied to welding pipe. Fig. 4 is a top plan view, and Fig. 5 is a side elevation showing my invention applied to welding a hoop.

C represents a suitable base, on which are mounted electro-magnets or permanent magnets A and B, their pole-pieces being preferably made curved to receive a pipe, (represented by D,) but insulated therefrom by a strip of insulating material $a$.

Q Q represent two small rollers set in the base of the machine, on which the pipe D is supported so that it can be easily moved.

R represents an upright arm on base C, carrying two projections, one of which (marked P) extends within the pipe and carries on its end an anvil H, insulated from arm P by the strip of insulating material $h$. The other arm O extends over arm P above pipe D and carries on its end an electro or permanent magnet E, whose core is preferably curved to permit it to lie near the upper surface of pipe D.

I and J represent upward extensions from the poles of magnets A and B or from the base, through which are tapped two screw-shafts F and G, whose inner ends are provided with insulating material $f$ $g$ and bear against the surface of the pipe D, the object of these two shafts being to force together the edges of the pipe which are to be welded.

M and N represent two screw-bolts tapped through the extensions I and J, but insulated therefrom, and the inner ends of these bolts can be screwed into contact with the pipe D. The bolt M is connected by conductor L with one pole of a generator of electricity, and the bolt N is connected by a conductor K with the other pole of a generator.

In practice I prefer to have the conductor K include the electro-magnets A and E before it connects with bolt M, so that the heating-current will energize said magnets. Of course this arrangement may be reversed, or the magnets may be put in shunt-circuits or may be energized from a separate source of electricity. When applied to welding a hoop, (marked D,) as shown in Figs. 4 and 5, the magnets E and B may be omitted, and also the arms P and O, in which case the joint of the hoop is clamped between a stationary clamp R and a movable clamp S, carried on the base C, the movable clamp being operated by means of a screw-shaft T, tapped into the base C and engaging with said clamp. These clamps are insulated from base C by the insulating material indicated at $s$, Figs. 4 and 5. The clamp S is connected by conductor K, which also includes the winding on magnet A, with one pole of a generator of electricity, and the clamp R is connected by conductor L with the other pole of said generator. The parts being assembled as shown in Figs. 1, 2, and 3 and the current being turned on, its natural path would be to flow from bolt M to bolt N through the pipe D in the direction shown by the arrows in Fig. 1; but this tendency is restricted and overcome by the magnetic influence of the magnets A and B, so that the current is forced to flow across the joint in the pipe, by which means the edges of the pipe at the joint become heated, and when they have reached a welding heat they are pressed together by the action of the screw-clamps F and G to form the weld, which may be completed by hammering, rolling, or any other known mode. At the same time the influence of magnet E increases the resistance of the pipe at the joint, thereby increasing the heating effect of the current; but the principal office of the magnet E is to prevent the welding-current from traversing the finished joint when pipe is being welded. As the magnet E lies in such position that the finished joint travels under said magnet as the welding operation progresses, it prevents the current which enters the pipe at M from passing through the finished joint and compels the current to cross the parts to be welded.

The pipe is fed forward as the weld progresses until it is welded through its entire length. This retarding influence on the welding-current is produced by having the lines of force in the fields of the magnets A, B, and E at right angles to the line of force of the welding-current, thereby producing a molecular change in the metal at that point, which results in raising its temperature and in retarding the passage of the welding-current. I prefer to make the magnets A and B present their north poles to the ring and the magnet E present a south pole, irrespective of the direction of the current across the joint, or I may make magnet B present its north pole, A its south pole, and with a current passing across the joint from $f$ to $g$, Fig. 1. E may present its south pole.

Various combinations may be devised, but in general I find that the polarity of the magnet E may be varied as the variations of polarity of magnets A and B. For example, I may use B north, A south, with currents passing from $g$ to $f$, Fig. 1, and make E present its north pole.

The operation is the same in welding a hoop, as shown in Figs. 4 and 5, the magnet A preventing the current from taking the short path through the hoop and forcing it to traverse the joint, and the screw-shaft J serving to force the ends of the hoop together to form the weld. The edges to be welded may be in contact and heated simply by the current passing through them, or they may be slightly separated to form a voltaic arc between them, my invention serving the same purpose in either case. Whenever in welding two pieces of metal electrically the weld is too long to be made at once, as in the case of pipe or metal plates, the portion first welded affords a short path for the electric current, and, if not prevented, the current would traverse the completed weld without heating the unjoined edges. This I prevent by interposing the resistance of a magnet to the passage of the current through the short path, the lines of force of the magnet being at an angle to the path of the current seeking to escape through the short cut and blocking the passage of the current.

What I claim as my invention, and desire to secure by Letters Patent, is—

1. The herein-described process of welding a continuous piece of metal by electricity, consisting in bringing together the edges to be welded, connecting the material on each side of the joint with the poles of a generator of electricity, passing an electric current through the material to be welded, interposing magnetic resistance to the direct passage of the current through the material without traversing the joint, and finally pressing the edges together to form the weld.

2. The herein-described process in the operation of welding metals electrically, consisting in resisting the passage of the current through the material in any other path than that of the proposed weld by subjecting any shorter path to magnetic influence.

CHARLES L. COFFIN.

Witnesses:
CHARLES B. LOTHROP,
GERTRUDE H. ANDERSON.